April 12, 1927. 1,624,379
C. M. ABBOTT
METHOD AND APPARATUS FOR DIPPING SHINGLES
Filed Aug. 17, 1925 2 Sheets-Sheet 1
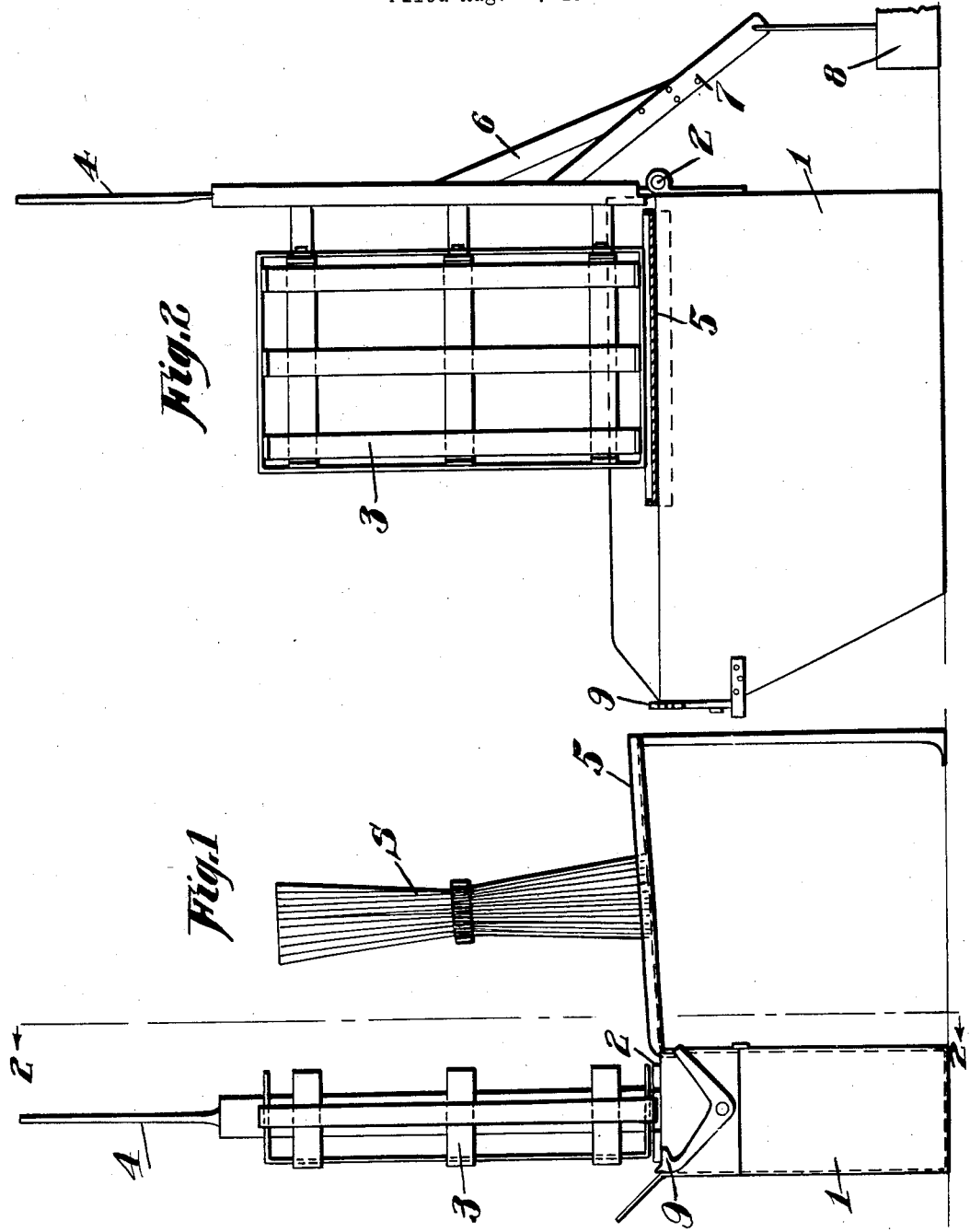
Inventor
Charles M. Abbott
By Ellis Spear Jr.
Attorney April 12, 1927.
C. M. ABBOTT
1,624,379
METHOD AND APPARATUS FOR DIPPING SHINGLES
Filed Aug. 17, 1925     2 Sheets-Sheet 2
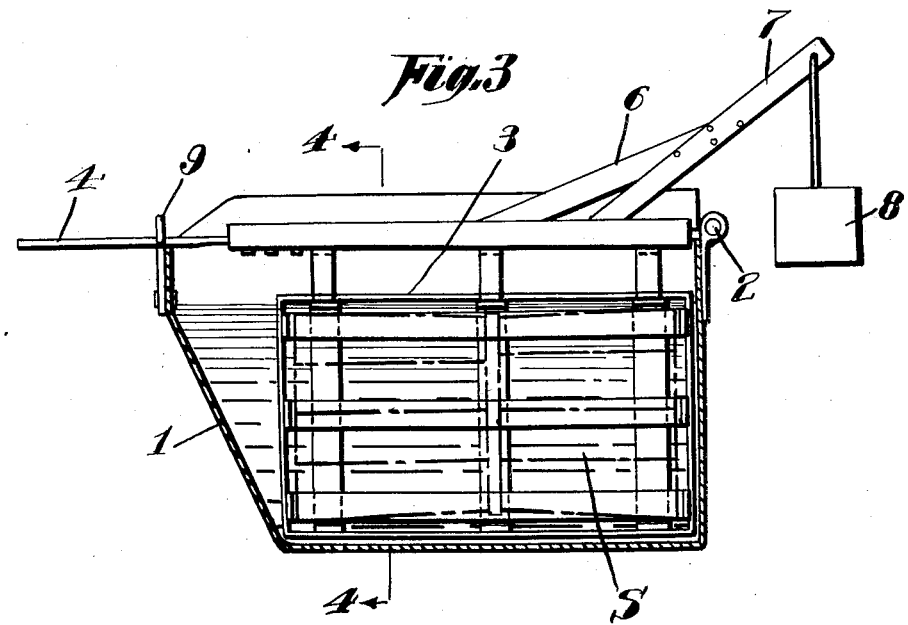
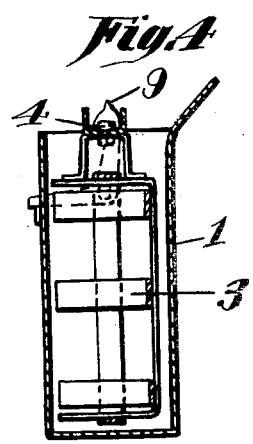
Inventor
Charles M. Abbott
By Ellis Spear Jr.
Attorney Patented Apr. 12, 1927.

1,624,379

UNITED STATES PATENT OFFICE.

CHARLES M. ABBOTT, OF WATERTOWN, MASSACHUSETTS, ASSIGNOR TO SAMUEL CABOT, INC., OF BOSTON, MASSACHUSETTS, A CORPORATION OF MASSACHUSETTS.

METHOD AND APPARATUS FOR DIPPING SHINGLES.

Application filed August 17, 1925. Serial No. 50,631.

This invention relates to a method of and apparatus for dipping various articles to which a protective coating or stain is to be applied. For purposes of this application I will discuss my invention in its relation to the dipping of bundles of shingles in which adaptation it finds a field of immediate utility. This treatment is purely illustrative, however, and in no way limiting.

Heretofore shingle bundles have usually been hand-dipped. Hand-dipping, however, is open to several objections. In order to insure complete application of the stain throughout the shingle bundle, it is necessary for the operator to completely immerse the bundle in the tank containing the stain, with the result that the operator's hands and arms become covered with the stain. On this account the operator does not always keep the bundle immersed in the stain long enough to insure complete coating of the shingles. Moreover, in withdrawing the bundle from the dipping tank, the surplus stain has a tendency to waste.

To the end, therefore, of avoiding the objections to hand-dipping, I have devised my present invention. According to it, the shingle bundles are successively placed in a hinged cage which is positioned over the dipping tank and the cage swung on its pivot to progressively immerse the shingle bundle in the stain, the arrangement being such that when the cage is fully lowered within the tank it may be latched, so as to insure that the shingles will receive a proper coating.

The cage swings about a horizontal axis from a vertical position outside of the tank to a horizontal position within the tank, and is counter-weighted so as to be automatically in approximate balance at either extreme of its pivotal motion, as well as at all intermediate positions. This relieves the operator of the necessity of physically holding up the cage at any point during its movement.

By arranging the cage to swing accurately into and out of the tank, I am enabled to attain an accelerated penetration and distribution of the stain in the entering movement of the cage into the dipping tank. The cage enters at an angle to the level of the stain in the tank, and the stain is thereby caused to penetrate through the laminations of the shingle bundle. In the withdrawing movement of the cage, the stain tends to spread over the surfaces of the shingle bundle in constantly changing directions and thus is caused to effectively cover all surfaces of the shingles, the surplus stain simply draining directly back into the dipping tank.

In the accompanying drawings I have shown apparatus for the practice of my invention which I have found satisfactory in use and well adapted for the purposes intended. In these drawings:

Fig. 1 is an end elevation of a shingle dipping machine in accordance with my invention.

Fig. 2 is a section on the line 2—2, of Fig. 1.

Fig. 3 is a section through the dipping tank and showing the position of the parts when the bundle cage is completely immersed and latched within the tank, and Fig. 4 is a section on the line 4—4, of Fig. 3.

I have indicated at 1 a dipping tank which is adapted to be filled with any suitable shingle stain. Where the ordinary stain is used, it is necessary to subsequently transfer the dipped bundles of shingles to a centrifugal machine shown in my prior Patent No. 1,105,055, dated July 28, 1914, which functions to distribute the stain completely along the shingle surface. Where a colloidal stain is used, however, such stain will penetrate and spread while the bundle is immersed within the dipping tank so that it is unnecessary to use a centrifugal machine except to expedite the drying of the shingles.

Horizontally fulcrumed at 2 to one of the walls of the dipping tank is a cage 3 which is of open frame-like construction and is provided with a manipulating handle 4. The cage is of a size completely to immerse within the dipping tank, and its bottom wall is disposed substantially in line with a shingle supporting table 5 on which the shingle bundles S are adapted to be successively placed in vertical endwise position as shown in Fig. 1. Extending from the shingle cage is an angularly disposed brace 6 which is fastened to a counterweight arm 7, also carried by said cage and provided at its lower end with a counter-weight 8. The arrangement of the brace 6 and the counter-weight 8 is such as to approximately counter-balance the cage at all positions thereof.

In use, a shingle bundle is entered vertically within the cage and the cage is then rocked upon its fulcrum 2 to cause it and the inserted shingle bundle to immerse within the dipping tank, as shown in Fig. 3. As the shingle bundle swings through an arc into the tank, the penetration of the stain through all the laminations of the bundle is accelerated. When fully immersed, the cage may be latched in the position shown in Fig. 3 by the engagement of the operating handle 4 with a latch 9 fixed to one of the tank walls.

In the withdrawing movement of the cage, the stain tends to spread over the entire surface of the shingles, due to the constantly changing position of the cage as it moves towards its withdrawn vertical position shown in Fig. 2, the surplus stain flowing directly back into the tank. The brace 6 and counterweight 8 effectively counterbalance the cage in all positions thereof, which relieves the operator of the necessity of himself sustaining the weight of the cage and the shingle bundle.

This submersion and emersion of the shingle bundle into the stain permits is ready and rapid penetration between the layers of shingles, while at the same time permitting the stain to expel the air through the unsubmerged crevices so that the stain can freely and uniformly reach all parts. I have discovered that the action of this colloidal stain is quite different from other stains. Not only does it combine with the other steps of my method in penetrating the shingle bundles, but it also, on account of the more perfect state of suspension of the pigment, carries uniformly to all parts and deposits an even pigment coat in the surfaces of the shingles. While, therefore, I do not claim to have invented the stain, which is the invention of another, I have conceived or discovered an adaptation of it as a type into the art of shingle staining.

Various modifications may be made in the apparatus and variations may be made in the step, all without departing from the spirit of my invention if within the limits of the appended claims.

What I therefore claim and desire to secure by Letters Patent is:—

1. The method of dipping bundled shingles which consists in supporting the shingle bundle with its laminations vertical to a body of liquid stain, in immersing the bundle by a swinging motion to enter and withdraw from the stain while maintaining the bundle with its laminations vertically disposed.

2. The method of dipping bundled shingles consisting in dipping said shingle bundle with its laminations disposed in a vertical plane to the dipping bath, and in withdrawing the said bundle from said bath and turning it at right angles to its previous position in the stain while maintaining its laminations in a vertical plane.

3. In a shingle dipping machine, a dipping tank, a bundle cage pivoted to said tank and adapted to support a bundle of shingles with its laminations at right angles to the line of pivot, and means for rocking the cage on its pivot to enter the bundle laterally into the said tank and to withdraw it therefrom to erected position, and a counter balance angularly attached to said cage and so disposed as to have its maximum effective length when the bundle is in substantially horizontal position.

4. In a shingle dipping machine, a dipping tank, a bundle cage pivoted to said tank and adapted to support a bundle of shingles with its major length vertical and with its laminations at right angles to the line of pivot, and means for rocking the cage on its pivot to enter the bundle laterally into the said tank and to withdraw it therefrom to erected position, and a counter balance angularly attached to said cage and so disposed as to have its maximum effective length when the bundle is in substantially horizontal position.

5. The method of dipping bundled shingles which consists in a progressive submersion and emersion of the shingle bundle by an arcuate movement while maintaining the bundle with its laminations in vertical position.

6. The method of dipping bundled shingles which consists in progressively submerging the shingle bundle with the laminations in vertical position and withdrawing and turning the bundle while maintaining the laminations in the same plane.

It testimony whereof I affix my signature.

CHARLES M. ABBOTT.